(12) United States Patent
Ciszewski et al.

(10) Patent No.: US 9,507,921 B2
(45) Date of Patent: Nov. 29, 2016

(54) USER-SPECIFIC APPLICATION ACTIVATION FOR REMOTE SESSIONS

(71) Applicant: Microsoft Corporation, Redmond, WA (US)

(72) Inventors: Piotr A. Ciszewski, Kirkland, WA (US); Tianyu Xie, Redmond, WA (US); Richard Moloney, Redmond, WA (US); Robert Donner, Bellevue, WA (US); Zhengyu Li, Richmond, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/482,769

(22) Filed: Sep. 10, 2014

(65) Prior Publication Data

US 2015/0286806 A1  Oct. 8, 2015

Related U.S. Application Data (60) Provisional application No. 61/976,259, filed on Apr. 7, 2014.

(51) Int. Cl.
G06F 17/30 (2006.01)
G06F 21/10 (2013.01)
G06Q 50/18 (2012.01)
G06F 21/60 (2013.01)

(52) U.S. Cl.
CPC ............ *G06F 21/105* (2013.01); *G06F 21/604* (2013.01); *G06Q 50/184* (2013.01); *G06F 2221/07* (2013.01); *G06F 2221/0704* (2013.01); *G06F 2221/0773* (2013.01)

(58) Field of Classification Search
CPC ...... G06F 21/10; G06F 21/105; G06F 21/12; G06F 21/6272
USPC ....... 726/26–30; 713/150, 165, 167; 705/51, 705/59
See application file for complete search history.

(56) References Cited

U.S. PATENT DOCUMENTS

| | | | | |
|---|---|---|---|---|
| 5,935,243 A | * | 8/1999 | Hasebe | G06F 21/10 705/59 |
| 6,873,975 B1 | * | 3/2005 | Hatakeyama | G06Q 40/04 380/259 |
| 7,353,541 B1 | * | 4/2008 | Ishibashi | G06F 21/10 348/E7.056 |

(Continued)

FOREIGN PATENT DOCUMENTS

EP  1426847 A2  6/2004

OTHER PUBLICATIONS

"International Search Report & Written Opinion Received for PCT Application No. PCT/US2015/023751", Mailed Date: Jul. 14, 2015, 13 Pages.

(Continued)

*Primary Examiner* — Hosuk Song
(74) *Attorney, Agent, or Firm* — Thomas S. Wong; Todd M. Lanning; Micky Minhas (57) ABSTRACT

Disclosed herein are systems, methods, and software to enhance licensing in multi-user computing environments. In an implementation, for each user of a plurality of users engaged with an application installed in a multi-user computing environment, a user-specific license state is maintained for the user with respect to the application. In addition, for each of the plurality of users engaged with the application installed in the multi-user computing environment, the application is delivered in accordance with the user-specific license state for the user.

19 Claims, 7 Drawing Sheets

(56) References Cited

U.S. PATENT DOCUMENTS

| | | | | |
|---|---|---|---|---|
| 7,359,883 B2* | 4/2008 | Namba | ............... | H04N 7/165 348/E5.004 |
| 7,590,856 B2* | 9/2009 | Morino | ............. | G06Q 20/3829 380/277 |
| 8,474,027 B2 | 6/2013 | Meijer et al. | | |
| 2006/0287959 A1 | 12/2006 | Blecken | | |
| 2008/0021838 A1 | 1/2008 | Wardaschka et al. | | |
| 2012/0079393 A1 | 3/2012 | Raithinam et al. | | |
| 2012/0110571 A1 | 5/2012 | Smith et al. | | |
| 2012/0311564 A1 | 12/2012 | Khalid | | |
| 2013/0198856 A1 | 8/2013 | Li et al. | | |

OTHER PUBLICATIONS

"Licensing Microsoft Office Software in Volume Licensing", Published on: Nov. 1, 2013, Available at: http://download.microsoft.com/download/3/D/4/3D42BDC2-6725-4B29-B75A-A5B04179958B/Licensing_Microsoft_Office_Software.pdf.

"Windows Server 2008 r2—Remote Desktop User Treated Differently than Local User—Server Fault", Published on: Oct. 25, 2012, Available at: https://web.archive.org/web/20121025031336/http://serverfault.com/questions/420172/remote-desktop-user-treated-differently-than-local-user.

Kediyal, et al., "Licit: Administering Usage Licenses in Federated Environments", In IEEE Transactions on Services Computing, vol. 7, Issue 1, Jan. 2014, pp. 96-108.

"Second Written Opinion Issued in PCT Application No. PCT/US2015/023751", Mailed Date: Mar. 31, 2016, 7 Pages.

"This Brief Applies to All Volume Licensing Programs", Retrieved from <<http://download.microsoft.com/download/3/D/4/3D42BDC2-6725-4B29-B75A-A5B04179958B/Licensing_Microsoft_Office_Software.pdf>>, Nov. 1, 2013, 8 Pages.

"International Preliminary Report on Patentability Issued in PCT Application No. PCT/US2015/023751", Mailed Date: Jun. 22, 2016, 8 Pages.

* cited by examiner

USER-SPECIFIC APPLICATION ACTIVATION FOR REMOTE SESSIONS

RELATED APPLICATIONS

This application is related to, claims priority to, and incorporates by reference in its entirety, U.S. Provisional Application No. 61/976,259, filed on Apr. 7, 2014, and entitled "User-Specific Licensing For Multi-User Software Applications."

TECHNICAL DISCLOSURE

Various computing environments exist whereby multiple users share use of or access to a software application concurrently. A remote desktop server (sometimes referred to as a terminal server) is an example of a solution that serves the same instance of a software application to multiple users concurrently. Managing licensing and other rights in such an environment is difficult because each user experience is derived from the same instance of the application stored on disk. Thus, if the application is licensed to one user, then all users engaged with it through a remote desktop server will have the same access.

This situation causes disruptions to how many entities wish to manage their personnel's software usage. If all of the users on a given machine are licensed the same with respect to a particular software application installed on that machine, then no problem exists. However, situations arise where multiple users are licensed differently (or not licensed at all) with respect to a software application. If two or more of those users are logged into a remote desktop server concurrently, then at least one of them may be able to use a software application for which they are not properly licensed.

A similar situation exists with respect to any computer and the software installed on it—not just remote desktop servers. Many consumer devices allow for the creation of multiple user profiles, but licensing for a given application installed on a machine is associated with just one single person. It is customary for software vendors to acquiesce to the unlicensed use of software by one person (under one user profile) when the application is licensed to another person that installed the application using a different user profile. Such situations are problematic from the perspective of the software vendor, although not to the same degree as with organizations where the problem can quickly scale.

A remedy in the corporate or organizational setting includes ensuring that any users logged into a given remote desktop server all enjoy the same rights with respect to the applications installed on the underlying machines. However, such a solution is very difficult to implement and may even defeat the purpose of using scaling technologies.

OVERVIEW

Provided herein are systems, methods, and software to enhance licensing for software applications in multi-user environments. An application installed on a physical or virtual machine can be delivered to users in accordance with various license states. Each user may experience the application per a license state specific to that user. In some cases, the application is accessed through a remote desktop client and server configuration.

In an implementation, for each user of a plurality of users engaged with an application installed in a service platform that includes a remote desktop server, a user-specific license state for the user is maintained with respect to the application. In addition, for each of the plurality of users engaged with the application simultaneously, the application is delivered in accordance with the user-specific license state for the user via remote sessions established between the remote desktop server and a plurality of remote desktop clients corresponding to the plurality of users.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations disclosed herein enable enhanced licensing for software applications in multi-user scenarios. An application installed on a physical or virtual machine may be accessed simultaneously by multiple users and in accordance with various licenses for the users, rather than under the same license regime for all users. The application may then be delivered to each user in accordance with the license state for that user.

In a remote desktop or terminal server scenario, this allows one user to experience an application tailored to his or her specific license state for that application, while another user may experience the application in a different way, as it may be tailored differently for a different license state. The application may be installed on a host that includes a remote desktop server that serves the application simultaneously to multiple remote desktop clients in accordance with a remote desktop protocol. The host may be a physical host, a virtual host, or some combination or variation thereof.

In another example, one user may enjoy full feature access to an application while another user is provided with limited feature access to the application. In yet another example, one user may enjoy access to a full set of applications in an application suite, while another user may enjoy access to a limited set of applications in the application suite.

Full access to an application may be given to a user when it is determined that the user-specific license state for the user is in a valid state. Limited access to the application may be provided when it is determined that the user-specific license state is in an invalid state. Other intermediate states may exist and may be considered within the scope of this disclosure. For instance, a license could exist in a high, medium, or low state, and a corresponding range of accessibility may be provided with respect to the application.

Delivering an application in accordance a user-specific license state may include the application enabling or disabling various features in a feature set that correspond to any one of various license states that may be possible. The application may thus be executed with full access granted in the case of a valid license state, or executed with limited access granted when in an invalid license.

In some implementations, determining whether the user-specific license state comprises the valid state, the invalid state, or some other state may include processing an existing session token. The existing token may be found locally with respect to the application, in which case it can be processed to determine its validity. When the session token is not found locally, the application or other resource may attempt to obtain a new session token from an online licensing service that is remote from the application. The application may also attempt to retrieve a new token from the online licensing service when an existing token is found locally and its state is invalid.

In yet other implementations, an application determine whether to run the application in one of at least a session mode and a standard mode when starting. Maintaining the user-specific license state for users may occur when the application is in the session mode, but not while in the session mode.

Figure 1:
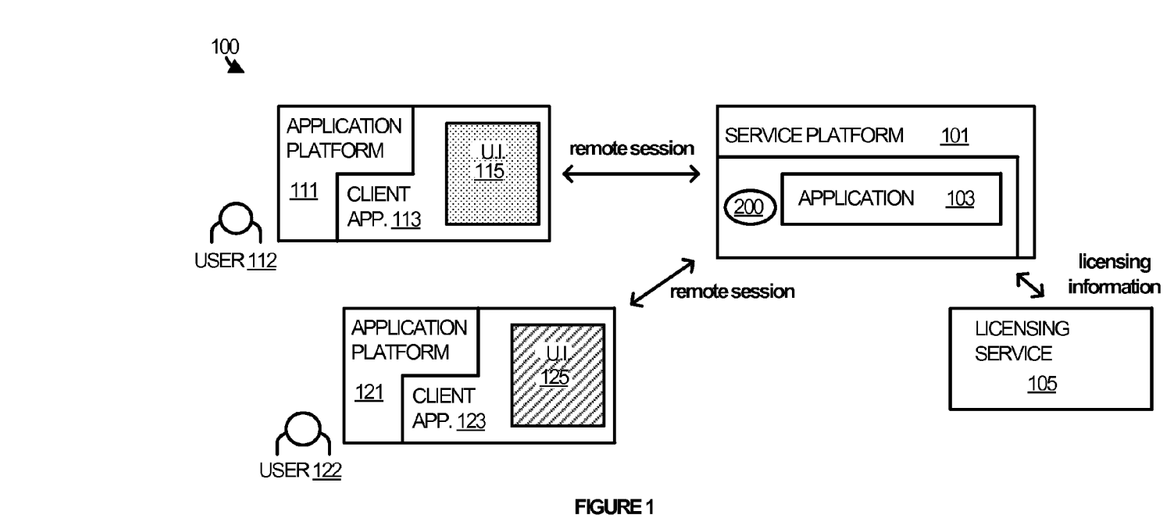
FIG. 1 illustrates an activation architecture in an implementation.

FIG. 1 illustrates an activation architecture 100 in an implementation. Activation architecture 100 includes service platform 101, which hosts application 103. Application 103 is an example of any application that can be shared amongst multiple users. In this illustration, application platform 111, via client application 113 and user interface 115, provides user 112 with access to an instance of application 103. Application platform 121, via client application 123 and user interface 125, provides user 122 with access to another instance of application 103. It may be appreciated that other elements in addition to those discussed herein may be included in activation architecture 100.

Figure 8:
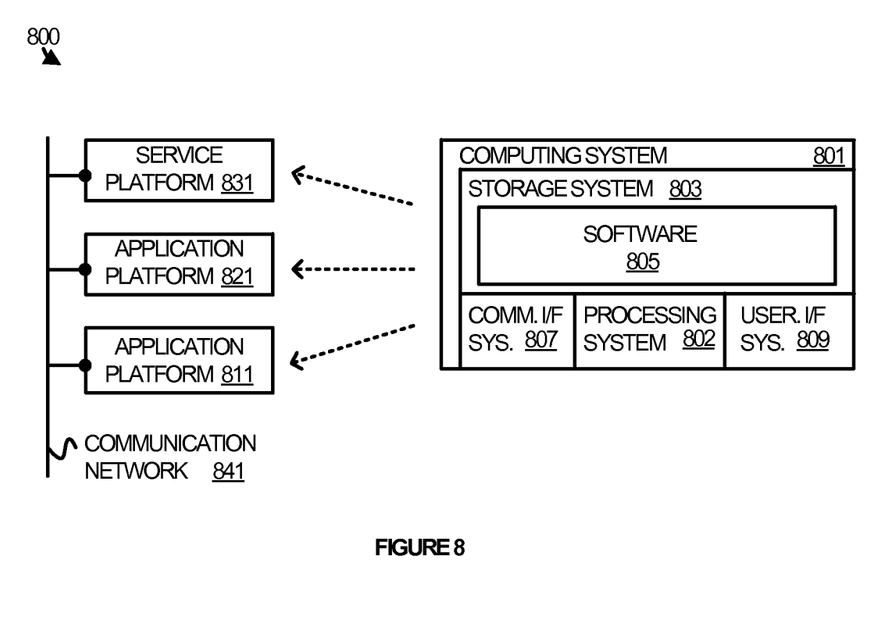
FIG. 8 illustrates a computing environment suitable for implementing any of the applications, services, processes, and operational scenarios disclosed herein with respect to FIGS. 1-7 and discussed in the Technical Disclosure below.

Service platform 101 is representative of any physical or virtual computing system, device, or collection thereof capable of hosting all or a portion of application 103 and implementing all or portions of process 200. Examples of service platform 101 include, but are not limited to, server computers, web servers, application servers, rack servers, blade servers, virtual machine servers, or tower servers, as well as any other type of computing system, of which computing system 801 illustrated in FIG. 8 is representative. In some scenarios, service platform 101 may be implemented in a data center, a virtual data center, or some other suitable facility.

Figure 2:
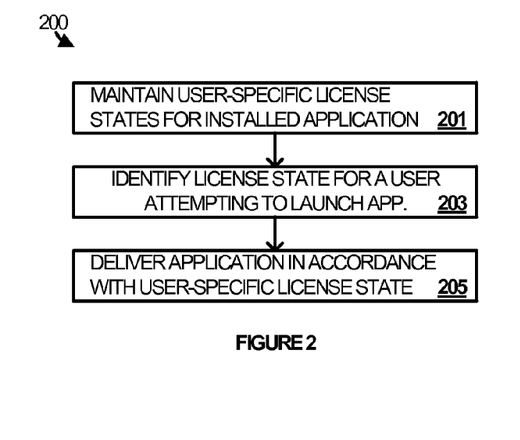
FIG. 2 illustrates an activation process in an implementation.

Application 103 is representative of any software application, module, component, or collection thereof, capable of implementing activation process 200. Examples include, but are not limited to, word processing applications, spreadsheet applications, presentation applications, web browsers, email applications, blogging and micro-blogging applications, social networking applications, e-commerce applications, and gaming applications, as well as any other type of suitable application.

Application platforms 111 and 121 are each representative of any physical or virtual computing system, device, or collection thereof capable of hosting a client application. Examples include, but are not limited to, smart phones, laptop computers, tablet computers, desktop computers, hybrid computers, gaming machines, smart televisions, entertainment devices, Internet appliances, and virtual machines, as well as any variation or combination thereof, of which computing system 801 illustrated in FIG. 8 is representative.

In operation, process 200 is employed by service platform 101 to manage licensing constraints associated with user 112 and user 122. Process 200 is illustrated in more detail with respect to FIG. 2. Process 200 may be a stand-alone application or program module. However, process 200 may also be integrated with application 103 in some implementations, or integrated with other applications.

Referring to FIG. 2, process 200 maintains user specific license states for application 103, or any installed application with which it may be associated (step 201). When a user attempts to launch an application within the context of a remote computing session, process 200 identifies a license state for that user and for the application being launched (step 203). Process 200 then delivers the application in accordance with the user-specific license state for that user (step 205).

In this manner, licensing for an application that is provided in the context of a multi-user environment can be applied on a per-user basis. For example, user 112 may be allowed access to application 103, while user 122 may be denied access, even though service platform 101 may host concurrent remote computing sessions for both users. In another example, user 112 may enjoy a higher grade of access to application 103 relative to user 122.

Figure 3:
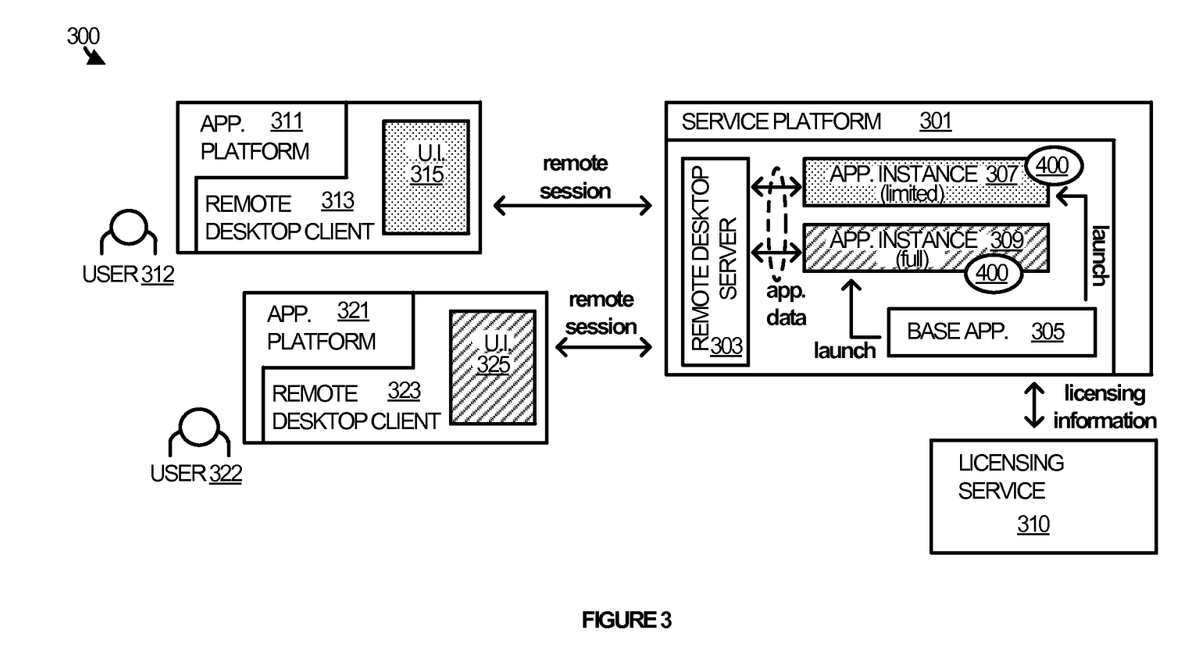
FIG. 3 illustrates an activation architecture in an implementation.

FIG. 3 illustrates activation architecture 300 in an implementation. Activation architecture 300 includes service platform 301, application platform 311, and application platform 321. Remote desktop server 303 is installed on service platform 301, as is base application 305. Remote desktop server 303 is capable of hosting remote desktop sessions with remote desktops. Applications installed on service platform 301 may be accessed by way of the remote desktop clients and sessions. Remote desktop server 303 may sometimes be referred to as a terminal server.

Application platform 311 includes remote desktop client 313. Remote desktop client 313 functions to provide user 312 with a user interface 315 to an instance of base application 305. Application platform 321 also includes a remote desktop client 323. Remote desktop client 323 functions to provide user 322 with a user interface 325 to an instance of base application 305. Application instance 307 and application instance 309 are representative of instances of base application 305.

Activation architecture 300 also includes licensing service 310. Licensing service is representative of an online licensing service that is remote from service platform 301 and that can provide licensing functionality to instances of base application 305. Licensing service 310 may operate at scale, in that it can provide licensing functionality for large number of application instances, not just application instances 307 and 309.

Figure 4:
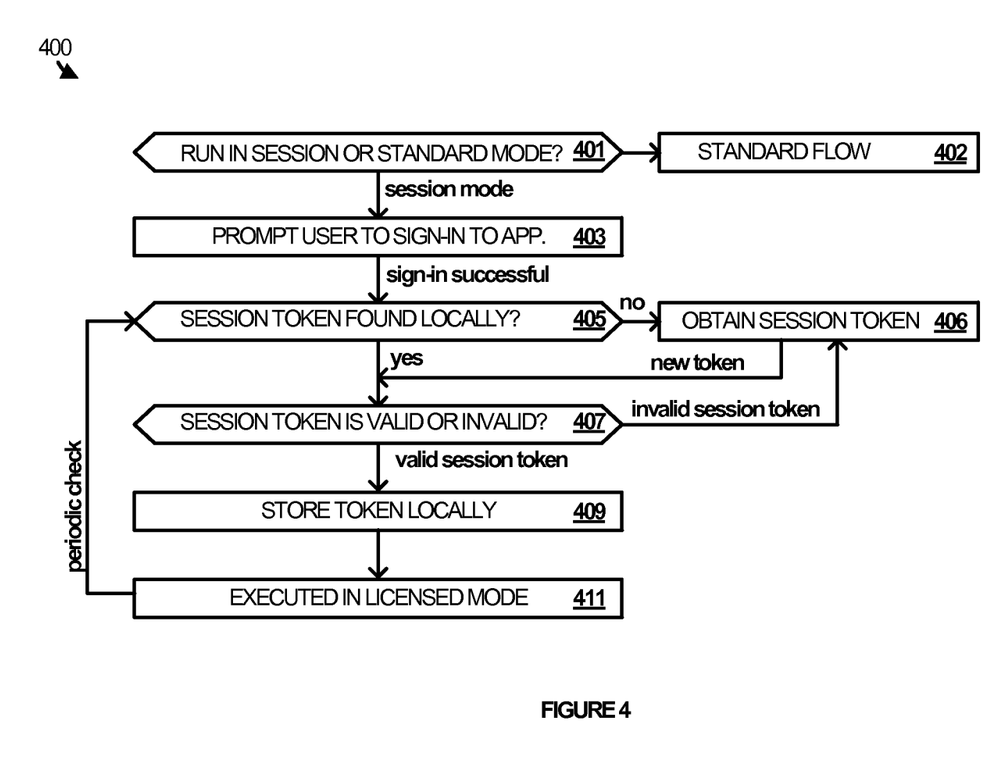
FIG. 4 illustrates an activation process in an implementation.

Service platform 301 is representative of any physical or virtual computing system, device, or collection thereof capable of hosting all or a portion of remote desktop server 303 and base application 305, and implementing all or portions of activation process 400. Examples of service platform 301 include, but are not limited to, server computers, web servers, application servers, rack servers, blade servers, virtual machine servers, or tower servers, as well as any other type of computing system, of which computing system 801 illustrated in FIG. 8 is representative. In some scenarios, service platform 301 may be implemented in a data center, a virtual data center, or some other suitable facility.

Base application 305 is representative of any software application, module, component, or collection thereof, capable of implementing activation process 400. Examples include, but are not limited to, word processing applications, spreadsheet applications, presentation applications, web browsers, email applications, blogging and micro-blogging applications, social networking applications, e-commerce applications, and gaming applications, as well as any other type of suitable application.

Application platforms 311 and 321 are each representative of any physical or virtual computing system, device, or collection thereof capable of hosting a remote desktop client. Examples include, but are not limited to, smart phones, laptop computers, tablet computers, desktop computers, hybrid computers, gaming machines, smart televisions, entertainment devices, Internet appliances, and virtual machines, as well as any variation or combination thereof, of which computing system 801 illustrated in FIG. 8 is representative.

In operation, remote desktop client 313 establishes a remote session with remote desktop server 303. Applications installed on service platform 301 may be accessed over the remote session. In this example, an instance of base application 305 is instantiated on service platform 301 during the remote session. The instance of base application 305 may be started when, for example, user 312 clicks on or otherwise selects an icon in user interface 315 that launches base application 305. In this example, application instance 307 is representative of an instance of base application 305 that is launched.

When starting, application instance 307 employs activation process 400 to identify a licensing state specific to user 312. Application instance 307 may then be configured and delivered over the remote session with remote desktop client 313 in accordance with the user-specific license state determined for user 312.

While user 312 is engaged with application instance 307, user 322 may click on or otherwise select an icon in user interface 325 that launches base application 305. Application instance 309 is launched accordingly. When starting, application instance 309 employs activation process 400 to identify a licensing state specific to user 322. Application instance 307 may then be configured and delivered over the remote session with remote desktop client 323 in accordance with the user-specific license state determined for user 322.

It is assumed for exemplary purposes in FIG. 3 that the licensing state for user 312 is different than the licensing state for user 322. In particular, application instance 307 is delivered with limited access while application instance 309 is delivered with full access granted. This difference is represented by the different fill patterns for application instance 307 and user interface 315, and application instance 309 and user interface 325.

FIG. 4 illustrates activation process 400 in detail. Activation process 400 is representative of any process that may be employed by an instance of base application 305 to provide user-specific licensing in the context of multi-user operations. The following discussion makes parenthetical reference to the steps illustrated in FIG. 4, although it may be appreciated that other steps in addition to those discussed herein are possible.

In operation, an application instance is launched from a base application. When starting, the application determines whether to run in session mode or standard mode, or possibly in some other mode (step 401). When started in standard mode, license activation is accomplished via a standard activation flow that is not concerned with multi-user access to an application (step 402). For example, a product key or service sign-in may be used to activate the application. In the standard flow, a single license profile would apply to any instance of the base application, even if various users may have different access rights.

In session mode, the license for the application instance is activated in such a manner that the application instance can be delivered in accordance with a license state for a specific user. In addition, session mode allows other instances of the same base application to be started and executed simultaneously, but under a different license state for a different user.

When proceeding in session mode, the application instance prompts a user to sign-in to the application or an associated application service (step 403). The user may provide his or her login credentials, such as a username and password that are used to confirm the identity of the user. In some cases the user may be verified locally, but in other cases licensing service 310 may be leveraged to assist with or handle sign-in. If sign-in is not successful, then the application instance may close, a message may be presented, or some other event may occur indicative of the unsuccessful attempt to sign-in. The sign-in step need not occur each and every time an application is started, although it is possible. In some scenarios the sign-in step may occur every so often, such as when an amount of time has expired, after a certain number of starts, and the like.

In the event that sign-in is successful, the application instance next checks locally for a session token (step 405). An existing token may be stored locally that is associated with a previous session or an ongoing session. If an existing token is not found locally, then a new session token is obtained from licensing service 310.

The session token is then processed to determine its validity (step 407). An existing token may still be valid in some circumstances, but in other circumstances an existing token may have expired or become invalid for some other reason. When an existing token is found to be invalid, then a new session token is requested from licensing service 410. The new token may then be analyzed for its validity.

When a session token is found to be valid, it is stored locally (step 409). Storing a session token locally preserves it for later starts of the application instance. As mentioned, a session token that is stored locally may eventually expire or otherwise become invalid, forcing the application instance to obtain a new token from licensing service 310.

In this example, a new or existing session token that is valid indicates that the user has full access rights to the application instance, while an invalid session token means that the user is given limited access to the application instance. This may manifest itself in which features of an application are unlocked for the user to enjoy, which applications in a suite of applications are available to the user, or in many other ways. The application instance is therefore executed in accordance with the specific license state for the user. Some users may enjoy full-featured access, while other users may enjoy access to a limited set of application features.

In other examples, a session token could have potential states in addition to or other than the valid and invalid states discussed above. For instance, a session token could have a three potential states: valid, intermediate, and invalid. The valid state could grant the user with full access to an application, while the intermediate state could grant the user with intermediate access. The invalid state could limit the user to accessing even fewer features than the intermediate state. Other variations and combinations in license states are possible and may be considered within the scope of the present disclosure.

Figure 5:
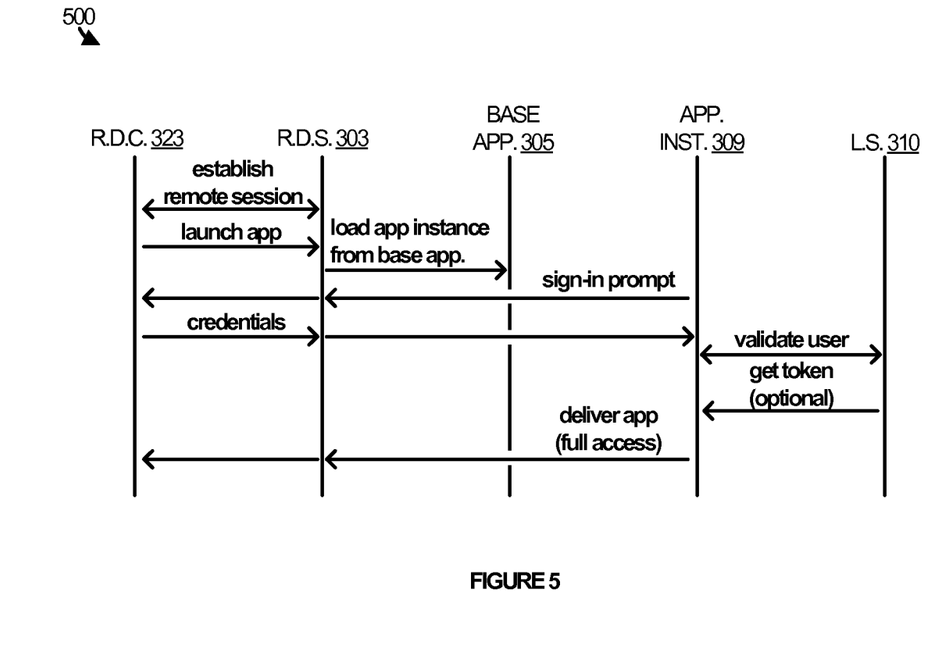
FIG. 5 illustrates an operational sequence in an implementation.

FIG. 5 illustrates an operational sequence 500 that represents an exemplary scenario that may occur when application instance 309 employs activation process 400. In operation, remote desktop client 323 establishes a remote session with remote desktop server 303. Base application 305 is then launched in the context of the remote session. Launching base application 305 results in application instance 309 executing in a runtime environment.

Application instance 309 prompts user 322 to sign-in to the application, application service, or some other environment or service. User 322 provides his or her credentials to application instance 309, which then either authenticates or authorizes the user or cooperates with licensing service 310 to handle the sign-in.

Next, application instance 309 searches locally for an existing token. But if one cannot be found, application instance 309 requests a new token from licensing service 310. Either an existing token found locally or a new token supplied by licensing service 310 are processed to determine the license state for user 322 with respect to base application 305. In this case, it assumed for exemplary purposes that user 322 enjoys full access to the application and it is delivered in a full-featured mode accordingly.

Figure 6:
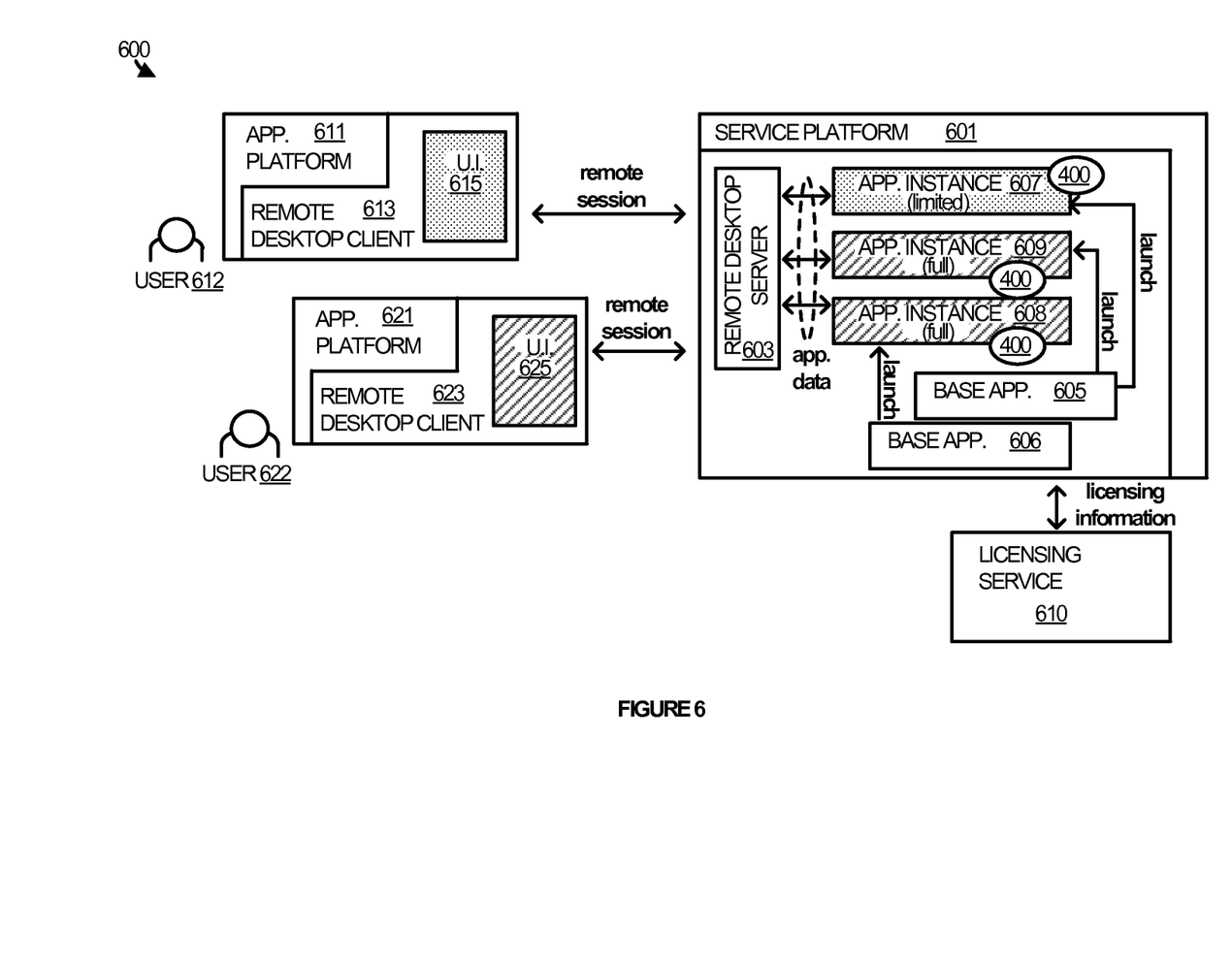
FIG. 6 illustrates an activation architecture in an implementation.

FIG. 6 illustrates activation architecture 600 in an implementation. Activation architecture 600 includes service platform 601, application platform 611, and application platform 621. Remote desktop server 603 is installed on service platform 601, as is base application 605 and base application 606. Remote desktop server 603 is capable of hosting remote desktop sessions with remote desktops. Applications installed on service platform 601 may be accessed by way of the remote desktop clients and sessions. Remote desktop server 603 may sometimes be referred to as a terminal server.

Application platform 611 includes remote desktop client 613. Remote desktop client 613 functions to provide user 612 with a user interface 615 to an instance of base application 605, an instance of base application 606, or both. Application platform 621 also includes a remote desktop client 623. Remote desktop client 623 functions to provide user 622 with a user interface 625 to an instance of base application 605, an instance of base application 606, or both. Application instance 607 and application instance 609 are representative of instances of base application 605, while application instance 608 is representative of an instance of base application 606.

Base application 605 and base application 606 are representative of any two or more applications that may be licensed together. Examples include software suites that include multiple applications provided under the same license. The applications may be developed and produced by the same software provider, examples of which include Microsoft® Office®, Microsoft® Office 365®, and various Adobe® products, as well as many other software suites. However, multiple software providers may be involved in such a licensing arrangement, such as when at least one application is provided by a software provider that differs from the provider of at least one other application. Other licensing regimes are possible and may be considered within the scope of the present disclosure.

Activation architecture 600 also includes licensing service 610. Licensing service is representative of an online licensing service that is remote from service platform 601 and that can provide licensing functionality to instances of base application 605 and base application 606. Licensing service 610 may operate at scale, in that it can provide licensing functionality for large number of application instances, not just application instances 607 and 609.

Service platform 601 is representative of any physical or virtual computing system, device, or collection thereof capable of hosting all or a portion of remote desktop server 603 and base applications 605 and 606, and implementing all or portions of activation process 400. Examples of service platform 601 include, but are not limited to, server computers, web servers, application servers, rack servers, blade servers, virtual machine servers, or tower servers, as well as any other type of computing system, of which computing system 801 illustrated in FIG. 8 is representative. In some scenarios, service platform 601 may be implemented in a data center, a virtual data center, or some other suitable facility.

Base applications 605 and 606 are each representative of any software application, module, component, or collection thereof, capable of implementing activation process 400. Examples include, but are not limited to, word processing applications, spreadsheet applications, presentation applications, web browsers, email applications, blogging and micro-blogging applications, social networking applications, e-commerce applications, and gaming applications, as well as any other type of suitable application.

Application platforms 611 and 621 are each representative of any physical or virtual computing system, device, or collection thereof capable of hosting a remote desktop client. Examples include, but are not limited to, smart phones, laptop computers, tablet computers, desktop computers, hybrid computers, gaming machines, smart televisions, entertainment devices, Internet appliances, and virtual machines, as well as any variation or combination thereof, of which computing system 801 illustrated in FIG. 8 is representative.

In operation, remote desktop client 613 establishes a remote session with remote desktop server 603. Applications installed on service platform 601 may be accessed over the remote session. In this example, an instance of base application 605 is instantiated on service platform 601 during the remote session. The instance of base application 605 may be started when, for example, user 612 clicks on or otherwise selects an icon in user interface 615 that launches base application 605. In this example, application instance 607 is representative of an instance of base application 605 that is launched.

When starting, application instance 607 employs activation process 400 to identify a licensing state specific to user 612. Application instance 607 may then be configured and delivered over the remote session with remote desktop client 613 in accordance with the user-specific license state determined for user 612.

While user 612 is engaged with application instance 607, user 622 may click on or otherwise select an icon in user interface 625 that launches base application 605. Application instance 609 is launched accordingly. When starting, application instance 609 employs activation process 400 to identify a licensing state specific to user 622. Application instance 607 may then be configured and delivered over the remote session with remote desktop client 623 in accordance with the user-specific license state determined for user 622.

Further in this example, an instance of base application 606 is instantiated on service platform 601 during the remote session. The instance of base application 606 may be started when, for example, user 622 clicks on or otherwise selects an icon in user interface 625 that launches base application 606. This may occur before, during, or after user 622 has engaged with application instance 609. In this example, application instance 608 is representative of an instance of base application 606 that is launched.

When starting, application instance 608 employs activation process 400 to identify a licensing state specific to user 622. The session token utilized to license the use of application instance 609 can be leveraged to license the use of application instance 608 by the same user, user 622. Application instance 608 may then be configured and delivered over the remote session with remote desktop client 623 in accordance with the user-specific license state determined for user 622.

It is assumed for exemplary purposes in FIG. 6 that the licensing state for user 612 is different than the licensing state for user 622. In particular, application instance 607 is delivered with limited access while application instance 609 and application instance 608 are delivered with full access granted. This difference is represented by the different fill patterns for application instance 607 and user interface 615 relative to the fill patterns for application instance 609, application instance 608, and user interface 625.

Figure 7:
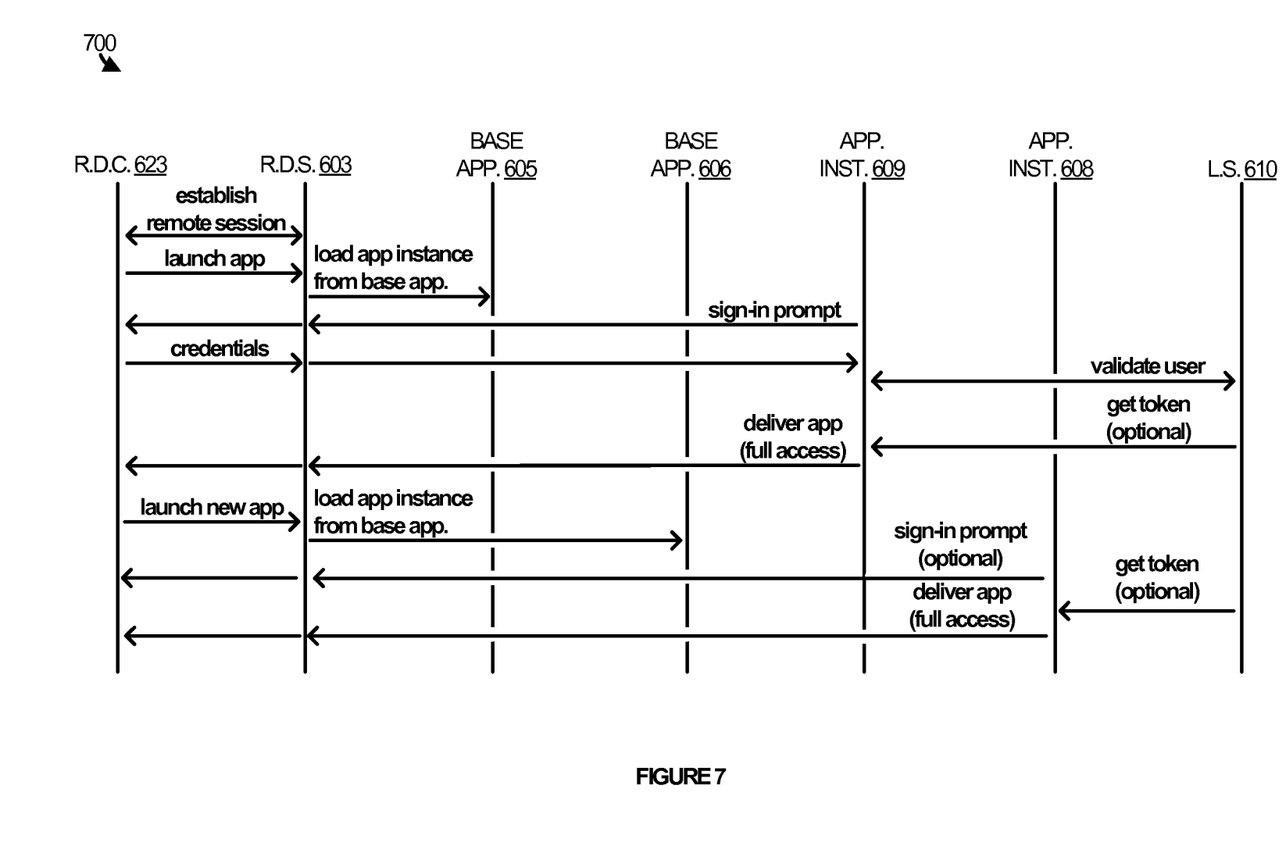
FIG. 7 illustrates an operational sequence in an implementation.

FIG. 7 illustrates an operational sequence 700 that represents an exemplary scenario that may occur when application instance 609 and application instance 608 employ activation process 400. In operation, remote desktop client 623 establishes a remote session with remote desktop server 603. Base application 605 is then launched in the context of the remote session. Launching base application 605 results in application instance 609 executing in a runtime environment.

Application instance 609 prompts user 622 to sign-in to the application, application service, or some other environment or service. User 622 provides his or her credentials to application instance 609, which then either authenticates or authorizes the user or cooperates with licensing service 610 to handle the sign-in.

Next, application instance 609 searches locally for an existing token. The existing token may be one that was previously downloaded in the context of licensing user 622 to use application instance 609. The existing token may also have been previously downloaded in the context of licensing user 622 to use application instance 608 at an earlier time. If one cannot be found, application instance 609 requests a new token from licensing service 610. Either an existing token found locally or a new token supplied by licensing service 610 are proceed to determine the license state for user 622 with respect to base application 605. In this case, it assumed for exemplary purposes that user 622 enjoys full access to the application and it is delivered in a full-featured mode accordingly.

Next, base application 606 is then launched in the context of the remote session. Launching base application 606 results in application instance 608 executing in a runtime environment. Application instance 608 may prompt user 622 to sign-in to the application, although this step may be skipped if the sign-in process performed with respect to application instance 609 can be leveraged. User 622 provides his or her credentials to application instance 608, which then either authenticates or authorizes the user or cooperates with licensing service 610 to handle the sign-in.

Next, application instance 608 searches locally for an existing token. The existing token may be one that was previously downloaded in the context of licensing user 622 to use application instance 609. The existing token may also have been previously downloaded in the context of licensing user 622 to use application instance 608 at an earlier time. If one cannot be found, application instance 608 may request a new token from licensing service 610. Either an existing token found locally or a new token supplied by licensing service 610 are processed to determine the license state for user 622 with respect to base application 606. In this case, it assumed for exemplary purposes that user 622 enjoys full access to the application and it is delivered in a full-featured mode accordingly.

The following is a brief discussion of a use-case to further illustrate various aspects and implementations. Office 365® ProPlus is licensed on a per user basis. In typical information worker environments a user owns/uses one or more desktop PCs on which they want to use Office®. The Office 365® license allows a single user to activate up to 5 such devices at the same time. Activation is device wide, i.e. all users sharing the device could use fully activated Office®.

There exist enterprise scenarios where a single machine is shared by multiple users (10s, 100s of users). A typical example is a Remote Desktop Services server to which users connect to access a "virtual desktop". The original activation solution cannot be used in such environments as it would allow multiple users to benefit from a single user's license, thus breaking the Office 365® licensing model.

An advance includes the concept of a traditional desktop software suite being licensed temporarily on a machine a user is accessing without affecting the licensing state for other users sharing the machine. A particular solution in which the user does not need to manage the licensing state of the machines he/she visits may also be appreciated. Instead the licensing service takes care of ensuring the user is within the usage limitations specified by the end user license. The ability to monitor usage and detect usage patterns outside of those covered by the license agreement may also be appreciated. This enables a scenario in which multiple separate applications comprising the Office® suite can share the same license. In some scenarios, the application may be allowed to request license renewal without prompting for user credentials.

In at least one operational scenario, an IT administrator can choose to provision desktop machines with Office 365® ProPlus with Shared Computer Activation (SCA) mode enabled in order to allow many users to share the same hardware and use their respective Office 365® licenses.

When a user boots an Office® application it detects that it is configured to use the SCA mode. The application automatically captures the user's Office 365® credentials (for some types of credentials) or prompts the user to manually provide their credentials (sign in). The application connects to the Office Licensing Service to authenticate the user and check if he is licensed to use Office 365® in this mode.

The service returns a "license token" which is generated specifically for that user and that machine; it is also generated for a specific time period after which it expires. The Office® application validates the token: it checks if the user running the application is the same as the user for whom the token was issued, checks if the machine is the same as the machine from which the token was requested, and finally verifies that the token has not expired.

If the token is valid, the application persists it on the local machine and fully activates. Other Office® applications, on boot, discover the locally persisted token, validate it and use it to activate without connecting to the Office Licensing Service.

If the locally persisted token has expired, the Office® application automatically attempts a call to the Office Licensing Service to get a new token; the code uses the user ID encoded in the expired token to identify which user identity to use to make the renewal code. This is done to optimize the user experience and minimize user exposure to sign in prompts.

FIG. 8 illustrates a computing environment 800 that is representative of an environment in which the various operational scenarios and processes disclosed herein may be implemented. Computing environment 800 includes application platform 811, application platform 821, and service platform 831.

Application platforms 811 and 821 are each representative of any computing apparatus, system, device, or collection thereof suitable for implementing a client application, such as such as client application 113 and 123 and remote desktop clients 313, 323, 613, and 623. Examples of application platforms 811 and 821 include, but are not limited to, desktop computers, work stations, laptop computers, tablet computers, smart phones, hybrid computers, gaming machines, virtual machines, smart televisions, and watches and other wearable devices, as well as any variation or combination thereof.

Service platform 831 is representative of any computing apparatus, system, or collection thereof capable of hosting applications and, in some cases, remote desktop servers. Examples of applications that could be implemented on service platform 831 include application 103, base application 305, base application 605, and base application 606. Examples of service platform 821 include server computers, rack servers, web servers, cloud computing platforms, and data center equipment, as well as any other type of physical or virtual server machine, and any variation or combination thereof. In some implementations, a collection of multiple computing systems may be employed to implement all or portions of an application or service which may be hosted in one or more data centers, virtual data centers, or any other suitable computing facilities.

Computing system 801 is an example of application platform 811, application platform 821, and service platform 831. Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. When executed by processing system 802 to implement enhanced activation and licensing in the context of remote computing sessions, software 805 directs processing system 802 to operate as described herein for the various processes, operational scenarios, and sequences discussed in the foregoing implementations. Computing system 801 may optionally include additional devices, features, or functionality not discussed for purposes of brevity.

Referring still to FIG. 8, processing system 802 may comprise a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. When computing system 801 is deployed as an application platform (e.g. application platforms 111, 121), software 805 may include program instructions for implementing a client application and user interface for engaging in a remote computing session. When computing system 801 is deployed as a service platform (e.g. service platforms 101, 301, and 601), software 805 may include program instructions for implementing process 200, activation process 400, and associated functionality.

In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to facilitate enhanced licensing and activation for applications in multi-user environments. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It may be understood that computing system 801 is generally intended to represent a computing system or systems on which software 805 may be deployed and executed in order to implement enhanced licensing activation. However, computing system 801 may also be suitable as any computing system on which software 805 may be staged and from where one or both may be distributed, transported, downloaded, or otherwise provided to yet another computing system for deployment and execution, or yet additional distribution.

Communication interface system 807 may include communication connections and devices that allow for communication with other computing systems (not shown) over communication network 841. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces can be input via user interface system 809.

Communication between application platform 811, application platform 821, and service platform 831 and any other computing system occurs over communication network 841 or other networks and in accordance with various communication protocols, combinations of protocols, or variations thereof. Examples of communication network 841 include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

While FIGS. 1-8 generally depict relatively few users and relatively few instances of service platforms, application platforms, and applications, it may be appreciated that the concepts disclosed herein may be applied at scale. For example, the applications and services disclosed herein could be deployed in support of any number of users.

Various technical effects may be appreciated from the foregoing implementations. The ability to support user-specific licenses in a multi-user scenario allows scaling technologies to be leveraged to their fullest potential. In the past, users with different license states relative to each other would be allocated to different machines. User-specific license activation as described herein allows multiple users with differing licensing profiles to use the same underlying machine resource (whether physical or virtual), thereby increasing the efficiency of an application deployment. In addition, user-specific licensing activation allows an application to be installed once on an underlying resource, which saves storage space on the underlying resource.

Various improvements to multi-user technology may also be appreciated from the foregoing implementations. Multi-user technology (such as terminal servers/remote desktop servers) allow multiple users to access the same application on a computing resource. The activation processes and other subject matter disclosed herein improves such technology by allowing the users to enjoy the same application, but in accordance with a license state specific to each user. An application instance derived from a base application may be served to one user in accordance with a license state for that user over a remote session. At the same time, another application instance derived from the same base application may be served to another user in accordance with a different license state for that user over a remote session.

Certain inventive aspects may be appreciated from the foregoing disclosure, of which the following are various examples.

EXAMPLE 1

One or more computer readable storage media having program instructions stored thereon for facilitating user-specific license states for applications that, when executed by a processing system, direct the processing system to at least: identify in which mode of at least a session mode and a standard mode to activate licensing for an application; when in the session mode, maintain a user-specific license state for each of a plurality users engaged with the application simultaneously via a remote session and deliver the application in accordance with the user-specific client state for each of the plurality users; and when in the standard mode, maintain a single license state and deliver the application in accordance with the single license state for all of the plurality of users.

EXAMPLE 2

The computer readable storage media of Example 1 wherein, to maintain the user-specific license state, the program instructions direct the processing system to determine whether the user-specific license state comprises a valid state that entitles a user to full access to the application or an invalid state that results in limited access to the application.

EXAMPLE 3

The computer readable storage media of Examples 1-2 wherein, to deliver the application in accordance with the user-specific license state, the program instructions direct the processing system to execute the application with the full access to the application enabled when the user-specific license state comprises the valid state and execute the application with the limited access to the application enabled when the user-specific license state comprises the invalid state.

EXAMPLE 4

The computer readable storage media of Examples 1-3 wherein, to determine whether the user-specific license state comprises the valid state or the invalid state comprises processing an existing session token to determine whether the user-specific license state comprises the valid state or the invalid state.

EXAMPLE 5

The computer readable storage media of Examples 1-4 wherein the program instructions further direct the processing system to search locally with respect to the application for the existing session token and, when the session token is not found locally, attempt to obtain a new session token from an online licensing service that is remote from the application.

EXAMPLES 6

The computer readable storage media of Examples 1-5 wherein the program instructions further direct the processing system to, in response to having determined from the existing to token that the user-specific license state comprises the invalid state, attempt to obtain the new session token from the online service.

EXAMPLES 7

The computer readable storage media of Examples 1-6 further comprising installing the application on a host that includes a remote desktop server that serves the application simultaneously to multiple remote desktop clients in accordance with a remote desktop protocol, wherein the host comprises at least one of a physical host and a virtual host.

EXAMPLE 8

The computer readable storage media of Examples 1-7 wherein the program instructions further direct the processing system to, when starting the application, determine whether to run the application in one of at least a session mode and a standard mode, wherein the program instructions direct the processing system to maintain the user-specific license state for each of the plurality of users only when the application runs in the session mode.

EXAMPLE 9

A method for facilitating multi-user access to applications comprising: for each user of a plurality of users engaged with an application installed in a service platform that includes a remote desktop server, maintaining a user-specific license state for the user with respect to the application; and for each of the plurality of users engaged with the application simultaneously, delivering the application in accordance with the user-specific license state for the user via remote sessions established between the remote desktop server and a plurality of remote desktop clients corresponding to the plurality of users.

EXAMPLE 10

The method of Example 9 wherein maintaining the user-specific license state for the user with respect to the application comprises determining whether the user-specific license state for the user comprises a valid state that entitles the user to full access to the application or an invalid state that results in limited access to the application.

EXAMPLE 11

The method of Examples 9-10 wherein delivering the application in accordance with the user-specific license state for the user comprises executing the application with the full access to the application enabled when the user-specific license state comprises the valid state and executing the application with the limited access to the application enabled when the user-specific license state comprises the invalid state.

EXAMPLE 12

The method of Examples 9-11 wherein determining whether the user-specific license state for the user comprises the valid state or the invalid state comprises processing an existing session token to determine whether the user-specific license state of the user comprises the valid state or the invalid state.

EXAMPLE 13

The method of Examples 9-12 further comprises searching locally with respect to the application for the existing session token and, when the session token is not found locally, attempting to obtain a new session token from an online licensing service that is remote from the application.

EXAMPLE 14

The method of Examples 9-13 further comprising, in response to determining from the existing to token that the user-specific license state comprises the invalid state, attempting to obtain the new session token from the online service.

EXAMPLE 15

The method of Examples 9-14 further comprising the remote desktop server serving the application simultaneously to the plurality of remote desktop clients in accordance with a remote desktop protocol.

EXAMPLE 16

The method of Examples 9-15 further comprising installing the application on a host on which the remote desktop server is installed, wherein the host comprises at least one of a physical host and a virtual host.

EXAMPLE 17

The method of Examples 9-16 further comprising, when starting the application, determining whether to run the application in one of at least a session mode and a standard mode.

EXAMPLE 18

The method of Examples 9-17 wherein maintaining the user-specific license state occurs when the application runs in the session mode and does not occur when the application runs in the standard mode.

EXAMPLE 19

An apparatus comprising: one or more computer readable storage media; and program instructions stored on the one or more computer readable storage media for facilitating user-specific license states for applications accessible via a remote desktop server that, when executed by a processing system, direct the processing system to at least: for each user of a plurality of users engaged with an application through the remote desktop server and a plurality of remote desktop clients, maintain a user-specific license state for the user with respect to the application; and for each of the plurality of users engaged with the application through the remote desktop server and the plurality of remote desktop clients, delivering the application in accordance with the user-specific license state for the user.

EXAMPLE 20

The apparatus of Example 19 further comprising the processing system, wherein the program instructions further direct the processing system to, when starting an application, determine whether to run the application in one of at least a session mode and a standard mode, wherein the program instructions direct the processing system to maintain the user-specific license state when in the session mode and not when in the standard mode.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon for facilitating user-specific license states for applications that, when executed by a processing system, direct the processing system to at least:
    identify in which mode of at least a session mode and a standard mode to activate licensing for an application;
    when in the session mode, maintain a user-specific license state for each of a plurality users engaged with the application simultaneously via a remote session and deliver the application in accordance with the user-specific license state for each of the plurality users; and
    when in the standard mode, maintain a single license state and deliver the application in accordance with the single license state for all of the plurality of users.

2. The computer readable storage media of claim 1 wherein, to maintain the user-specific license state, the program instructions direct the processing system to determine whether the user-specific license state comprises a valid state that entitles a user to full access to the application or an invalid state that results in limited access to the application.

3. The computer readable storage media of claim 2 wherein, to deliver the application in accordance with the user-specific license state, the program instructions direct the processing system to execute the application with the full access to the application enabled when the user-specific license state comprises the valid state and execute the application with the limited access to the application enabled when the user-specific license state comprises the invalid state.

4. The computer readable storage media of claim 3 wherein, to determine whether the user-specific license state comprises the valid state or the invalid state comprises processing an existing session token to determine whether the user-specific license state comprises the valid state or the invalid state.

5. The computer readable storage media of claim 4 wherein the program instructions further direct the processing system to search locally with respect to the application for the existing session token and, when the session token is not found locally, attempt to obtain a new session token from an online licensing service that is remote from the application.

6. The computer readable storage media of claim 5 wherein the program instructions further direct the processing system to, in response to having determined from the existing to token that the user-specific license state comprises the invalid state, attempt to obtain the new session token from the online service.

7. The computer readable storage media of claim 1 further comprising installing the application on a host that includes a remote desktop server that serves the application simultaneously to multiple remote desktop clients in accordance with a remote desktop protocol, wherein the host comprises at least one of a physical host and a virtual host.

8. The computer readable storage media of claim 2 wherein the program instructions further direct the processing system to, when starting the application, determine whether to run the application in one of at least a session mode and a standard mode, wherein the program instructions direct the processing system to maintain the user-specific license state for each of the plurality of users only when the application runs in the session mode.

9. A method for facilitating multi-user access to applications comprising:
  determining when starting an application whether to run the application in one of at least a session mode and a standard mode;
  for each user of a plurality of users engaged with an application installed in a service platform that includes a remote desktop server, maintaining a user-specific license state for the user with respect to the application when the application is running in the session mode;
  for each of the plurality of users engaged with the application simultaneously, delivering the application in accordance with the user-specific license state for the user via remote sessions established between the remote desktop server and a plurality of remote desktop clients when the application is running in the session mode; and
  when running the application in the standard mode, maintaining a single license state and delivering the application in accordance with the single license state.

10. The method of claim 9 wherein maintaining the user-specific license state for the user with respect to the application comprises:
  determining whether the user-specific license state for the user comprises a valid state that entitles the user to full access to the application or an invalid state that results in limited access to the application.

11. The method of claim 10 wherein delivering the application in accordance with the user-specific license state for the user comprises executing the application with the full access to the application enabled when the user-specific license state comprises the valid state and executing the application with the limited access to the application enabled when the user-specific license state comprises the invalid state.

12. The method of claim 11 wherein determining whether the user-specific license state for the user comprises the valid state or the invalid state comprises processing an existing session token to determine whether the user-specific license state of the user comprises the valid state or the invalid state.

13. The method of claim 12 further comprises searching locally with respect to the application for the existing session token and, when the session token is not found locally, attempting to obtain a new session token from an online licensing service that is remote from the application.

14. The method of claim 13 further comprising, in response to determining from the existing to token that the user-specific license state comprises the invalid state, attempting to obtain the new session token from the online service.

15. The method of claim 9 further comprising the remote desktop server serving the application simultaneously to the plurality of remote desktop clients in accordance with a remote desktop protocol.

16. The method of claim 15 further comprising installing the application on a host on which the remote desktop server is installed, wherein the host comprises at least one of a physical host and a virtual host.

17. The method of claim 9 wherein maintaining the user-specific license state does not occur when the application runs in the standard mode.

18. An apparatus comprising:
  one or more computer readable storage media; and
  program instructions stored on the one or more computer readable storage media for facilitating user-specific license states for applications accessible via a remote desktop server that, when executed by a processing system, direct the processing system to at least:
    determine when starting an application whether to run the application in one of at least a session mode and a standard mode;
    for each user of a plurality of users engaged with an application through the remote desktop server and a plurality of remote desktop clients, maintain a user-specific license state for the user with respect to the application when the application is running in the session mode;
    for each of the plurality of users engaged with the application through the remote desktop server and the plurality of remote desktop clients, activate the application in accordance with the user-specific license state for the user when the application is running in the session mode; and
    when the application is running in the standard mode, maintain a single license state and deliver the application in accordance with the single license state.

19. The apparatus of claim 18 further comprising the processing system, wherein the program instructions further direct the processing system to not maintain the user-specific license state when in the standard mode.

* * * * *